United States Patent [19]

Halberschmidt et al.

[11] 3,785,229

[45] Jan. 15, 1974

[54] APPARATUS AND METHOD FOR CUTTING GLASS

[75] Inventors: Friedrich Halberschmidt, Merkstein; Josef Audi, Aachen, both of Germany

[73] Assignee: Saint-Gobain, Neuilly-sur-Seine, France

[22] Filed: Mar. 21, 1972

[21] Appl. No.: 236,601

[30] Foreign Application Priority Data

Mar. 22, 1971 France .............................. 7109942

[52] U.S. Cl............................. 83/6, 83/294, 83/295, 83/319
[51] Int. Cl....... C03b 33/02, B26d 3/08, B26d 5/38
[58] Field of Search ..................... 83/294, 319, 6, 7, 83/12, 465, 295; 270/69

[56] References Cited
UNITED STATES PATENTS

| 3,081,657 | 3/1963 | Harris | 83/319 X |
|---|---|---|---|
| 3,506,172 | 4/1970 | Wehr | 83/319 X |
| 3,169,429 | 2/1965 | Bognar | 83/319 X |
| 1,729,582 | 9/1929 | Kast | 83/465 |
| 3,164,046 | 1/1965 | Arnaud | 83/319 X |
| 3,377,900 | 4/1968 | Baker | 83/319 X |
| 3,566,728 | 3/1971 | Ohmasu | 83/319 X |
| 3,656,385 | 4/1972 | Kimball | 83/294 X |

Primary Examiner—Frank T. Yost
Attorney—Willis H. Taylor, Jr. et al.

[57] ABSTRACT

A method of scoring glass at a selected distance from the end of an advancing ribbon of glass which comprises poising scoring means in proximity to the ribbon, moving the ribbon past the scoring means and measuring the length of glass which passes the scoring means, accelerating the scoring means parallel to the moving ribbon and out of contact with it until its speed is slightly less than that of the ribbon as the end of the selected length approaches the scoring means, attaching the moving ribbon and scoring means together as the end of the length to be cut reaches the scoring means whereby they move in unison, activating the scoring means, disengaging the scoring means, and returning it to its original position.

3 Claims, 5 Drawing Figures

APPARATUS AND METHOD FOR CUTTING GLASS

This invention relates to the construction and operation of a machine for transversely cutting a glass ribbon in movement in which the length of glass to be severed from its advancing end is registered in a measuring instrument and in which a cutting bridge is mounted for movement over and parallel to the ribbon and is coupled to the ribbon so as to move with it during the scoring of the glass, the score being traced while the bridge and ribbon are traveling at the same speed. The bridge is uncoupled from the ribbon after the scoring and returned to its upstream position ready for the next operation.

In known apparatus of this type the cutting bridge stands in its upstream position until the length of glass to be severed has passed, and at that moment the bridge is coupled to the ribbon by direct contact with the ribbon. In that technique the bridge is accelerated to ribbon speed in a very short time and, because of the mass of the bridge, generates problems of some magnitude. The braking force exerted on the ribbon by the bridge reduces the output of the apparatus and causes differences in the lengths cut off. Such imperfections were tolerable with apparatus of the speeds of production of standard apparatus. But with increase in rates of production such irregularities are not acceptable.

It is an object of the invention to provide a process of severance which removes the difficulties inherent in such prior art methods. Another object is to provide efficient apparatus for scoring glass ribbon and which is quick in operation, reduces braking effect to a minimum, increases output, and improves the quality of the product by substantially eliminating the forces which previously acted on the ribbon at the moment of coupling the bridge thereto.

These objects are accomplished, generally speaking, by accelerating the bridge out of contact with the ribbon until it is at a speed only slightly less than that of the ribbon before the scoring element coincides with the imaginary cutting line marking the inner end of the piece which is to be severed, coupling the ribbon and bridge together as they coincide so that bridge and ribbon are locked together at the same speed, making the score, and freeing the bridge from the ribbon for its return trip.

In this way the forces necessary to acceleration are devoid of unfavorable action on the glass ribbon and the measurement of the last portion of the length of the glass which is to be cut off is carried out with a relative speed between the bridge and the glass which is very small. The last part of the measurement is made with great precision in distinction from prior practice. Furthermore the coupling, properly so-called, of the bridge to the glass ribbon involves only very small forces of acceleration so that precision on the length of the cut is not compromised and that the ribbon does not receive the damage which sometimes accompanied the coupling with prior methods and apparatus.

In accordance with the invention the cutting bridge is accelerated to a speed only a little less than the speed of the glass ribbon, moving, up to the instant of coupling, with a very small difference in speed.

According to another feature of the invention the acceleration of the cutting bridge from its upstream position of rest is initiated by a signal which is supplied by the same measuring apparatus which is used to measure the length of ribbon to be cut off.

The process according to the invention may be carried out in different ways. An apparatus which is convenient in practice is essentially characterized by the fact that the cutting bridge is provided with internal apparatus which moves it downstream and that the cutting bridge carries a measuring apparatus which measures the length of the glass sheet to be cut off and contains, in addition to an apparatus generating a signal at the moment when the exact length to be cut off has been reached, a second apparatus generating a signal at a predetermined instant of time prior to that signal which announces the coincidence of the cutting line and the scoring instrument, this latter signal being used to start the bridge from rest and to accelerate it to a speed approaching that of the glass ribbon. The apparatus for accelerating the bridge is advantageously coupled to the mechanism which drives the glass ribbon, through a gear train having a ratio of transmission less than 1. One is thus assured in a simple way that the bridge, after its pre-acceleration, will always be found within the same ratio of speeds regardless of the absolute speed of displacement of the ribbon.

According to another characteristic of the invention the apparatus includes in the gear train connected to the drive for the glass ribbon, a clutch which automatically disengages the bridge from its accelerating mechanism at the instsnt when the bridge is coupled to the ribbon.

In the preferred form of apparatus illustrated in the drawings the cutting bridge is attached directly to the moving ribbon of glass by means of a friction plate carried by the bridge, and which can be raised and lowered into and out of contact with the moving ribbon.

The above and further objects and novel features of the present invention will more fully appear from the following detailed description when the same is read in connection with the accompanying drawings. It is to be expressly understood however, that the drawings are for the purpose of illustration only and are not intended as a definition of the limits of the invention.

In the drawings wherein like reference charactes refer to like parts throughout the several views.

Figure 1:
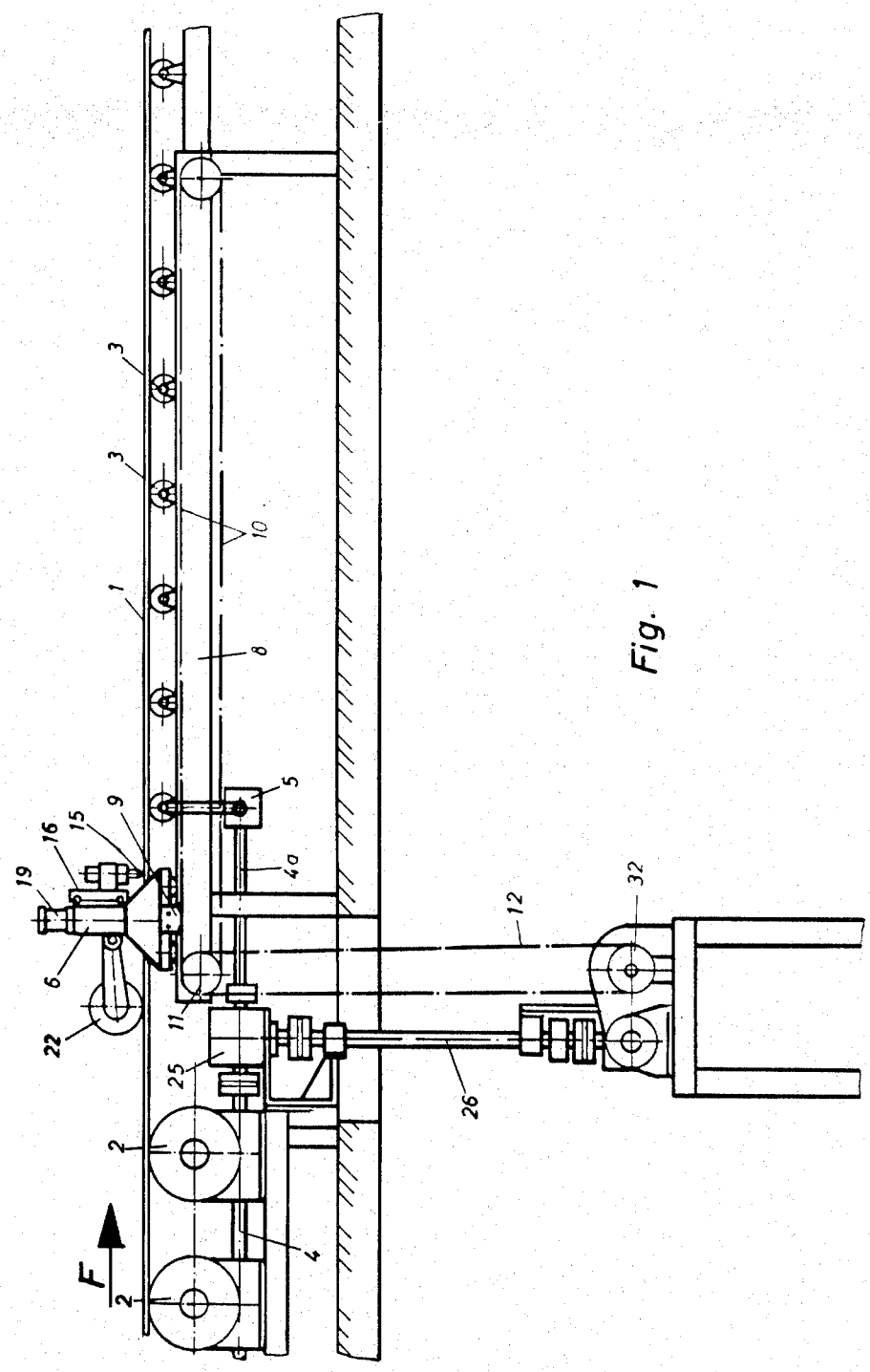
FIG. 1 is a diagrammatic side view of the essential parts of a cutting machine according to the invention.

The glass ribbon 1 after having been continuously formed and cooled in some known way, is carried on rollers 2, 3 in the direction of the arrow F, called downstream. The rollers 2 are driven through a shaft 4 and rollers 3 are driven by shaft 4a from some usual source of power not shwon. Details of the construction of such drives are obvious and are not illustrated. These rollers are driven at the same peripheral speed by linkage through the same gear box 5.

A pair of rails 8 extend along the opposite sides of the course of the glass ribbon and a cutting bridge 6 is mounted for translatory movement along them by rollers 7. At each end, the cutting bridge is connected by a belaying cleat 9 to chains 10, which are connected through sprocket wheels 11 to chains 12, which are in turn connected to a transmission 32, 31, 30, 29 which provides for the acceleration of the bridge from start to a speed approaching that of the glass, and for its return after the cut is made. The cutter 15 which scores the glass is supported by and slides along the bridge 6. This cutter is operated in the usual way, being thrust against the glass by the usual signal and lifted when the score has been made.

In this invention major attention is directed toward the problem of coupling the bridge to the moving glass, to achieve which the bridge supports a plate 18 of large surface area, just above and out of contact with the glass. The supports for the plate include two rods 20 which are attached to the plate, extend upward through the bridge, and are attached to the pistons in cylinders 19, which are operated pneumatically upon receipt of a signal, to raise or lower the rods and the plate, from and into contact with the moving ribbon of glass. The plate has a non-abrasive friction surface attached to its lower face, for instance a rubber pad with an intaglio surface pattern comosed of channels open to the air to prevent any suctional adherence to the glass at the moment of release.

The cutting bridge also carries a measuring wheel 22 which rolls on the glass at all times and is directly connected to an impulse generator 23 which emits electrical impulses corresponding to the passage of measured lengths of the glass. These impulses are sent to a counting unit 24 provided with a pre-selector which, at the moment when the impulses from the impulse generator match the length of glass selected for cutting as set in the pre-selector, starts the operation of the bridge.

Figure 2:
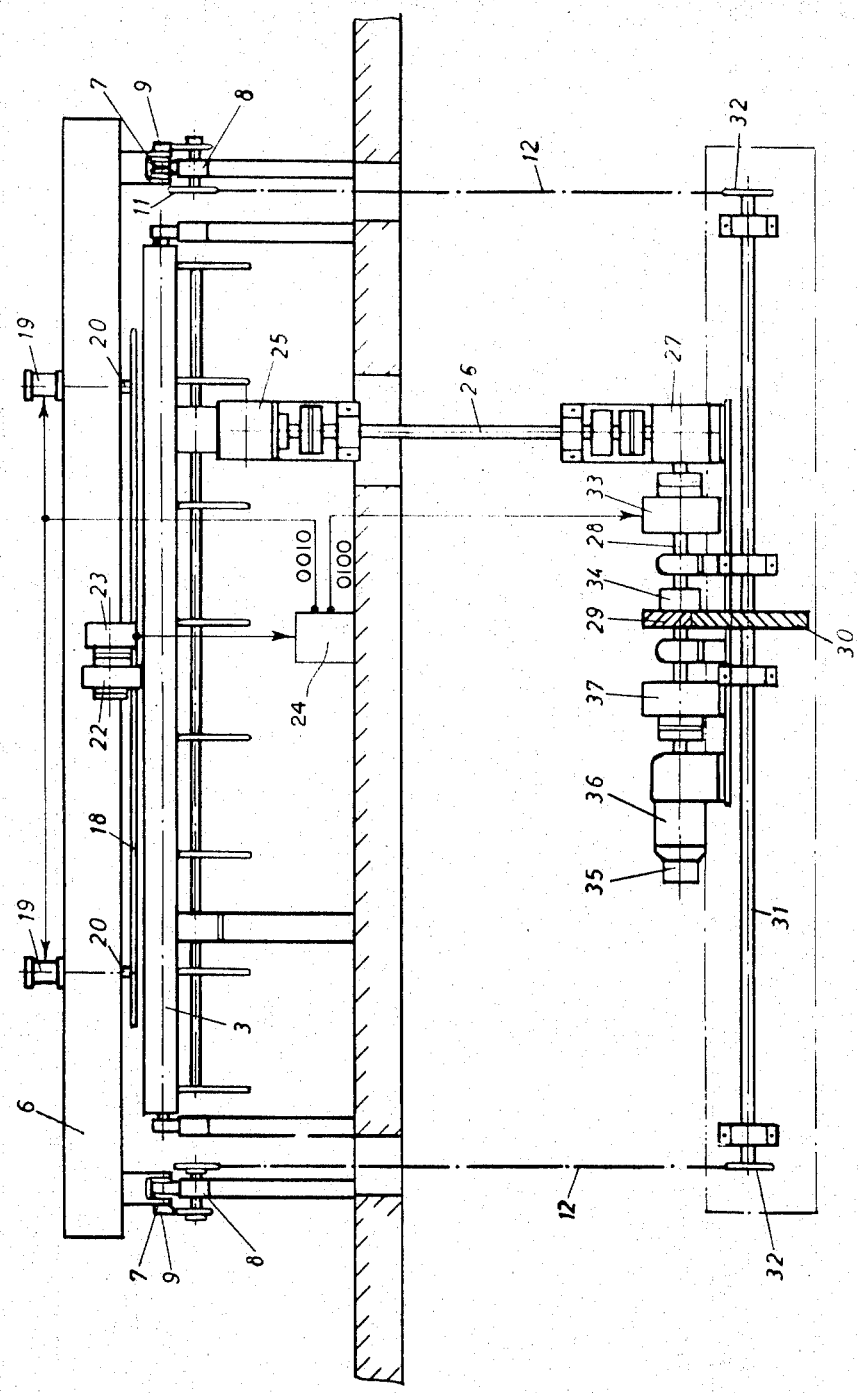
FIG. 2 is a diagrammatic end view, partly in section, of the same machine as viewed from its downstream end.
Figure 3:
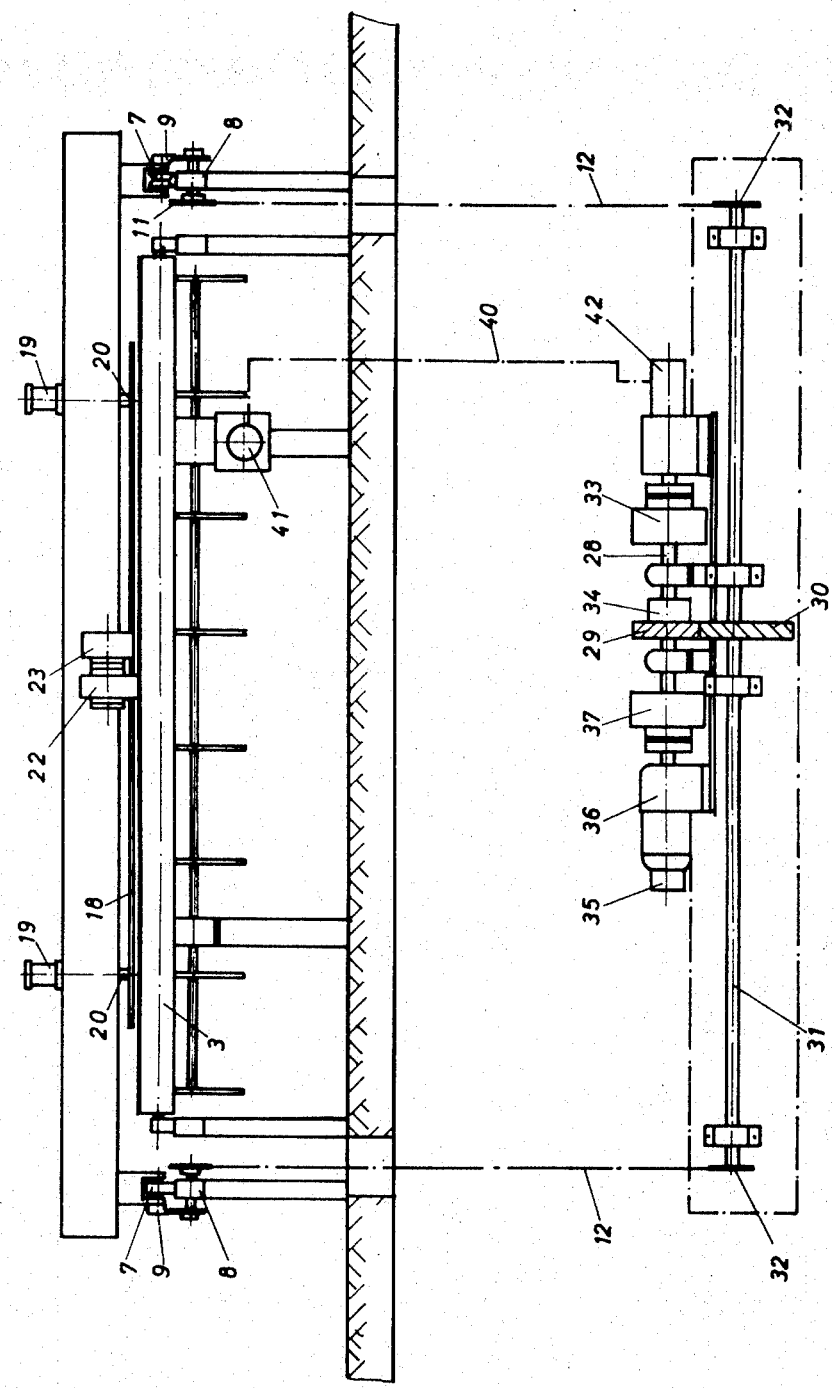
FIG. 3 is a view corresponding generally to FIG. 2 but showing a construction wherein the mechanical connections between shafts 4 and 28 are replaced by electrical telemetric connections.
Figure 5:
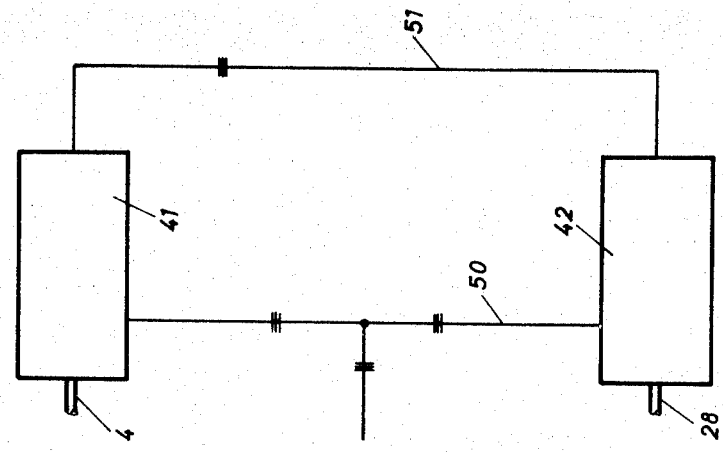
FIG. 5 is a diagram of a modified form of such connections.
Figure 4:
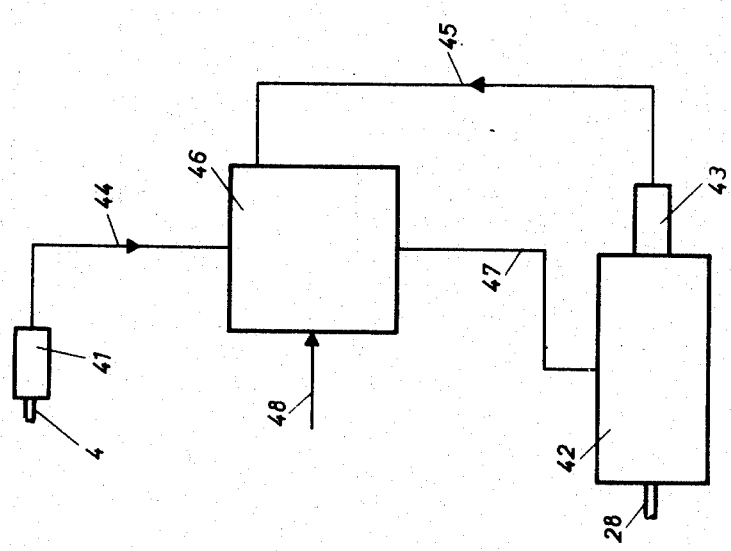
FIG. 4 is a diagram of one form which the telemetric connections may have.

The motion of the bridge downstream is provided for by drive shaft 4 of the rollers 2, which is connected by right angle gears in box 25 to shaft 26, which is connected through gear box 27, FIG. 2, and shaft 28, to a gear 29 which meshes with a gear 30, which drives shaft 31, and through chains 12 and sprockets 32 and 11, drives chains 10 which are connected to the ends by the bridge by couplings 9. This transmission is preferably constructed to provide a speed downstream of 90 to 95 percent of the speed of the glass ribbon.

In the power train between the gear box 27 and the gear 29 is an electrically operated clutch 33 and an overrunning clutch 34 which releases the gear 29 from the shaft 28 as soon as the speed of the bridge exceeds the 90 to 95 percent provided by the transmission, that is to say, as soon as the bridge is attached to and traveling at the speed of the glass.

On the other side of the gear 29 the shaft 28 carries the electric motor 36, the brake 35, and the electrically operated clutch 37, the function of which is to return the bridge to its upstream position after the cut or score is made.

The machine operates thus. The operation is started by setting the counter-preselector to the length of glass to be cut from the end of the advancing ribbon, at the same time registering in the same unit a length 6 to 10 cm., e.g., less than the said length. When the shorter length is reached by the roller 22 the counter emits a first signal which engages clutch 33 and drives chains 12 and 10 through gears 29, 30 and shaft 31, which start the cutting bridge and accelerate it to a speed slightly less than that of the glass. The measuring roller 22 is now turning at a much reduced speed which continues until a moment when, the exact length having been measured, a second signal activates the cylinders 19 and lowers the plate 18 onto the glass, equalizing the speed of glass and bridge. The bridge now moves at the speed of the glass, which is slightly superior to the speed produced by the transmission and disengages the clutch 33, thus disconnecting the drive. The scribe 15 is now activated and scores the glass at the preselected length. When the scoring is finished the bridge is freed from the glass by raising the plate 18 and the bridge is stopped by disengaging clutch 33. The clutch 37 is then engaged and returns the bridge to its starting position, the motor 36 is de-energized and braked. The clutch 37 is again disconnected, and the motor starts again, putting the apparatus in condition for another cycle. During the return of the bridge to starting position the counting mechanism is again measuring the ribbon passing beneath it and initiates the new cycle as soon as the selected length of ribbon has passed beneath it. It will be observed that the gears 29, 30 are driven by rollers 2 or by the same source of power that drives rollers 2 and 3, during the first part of the cycle, and in one direction, and that during the second part of the cycle they are driven in the opposite direction by the motor 36.

The impulse generators may be of different kinds, for instance a photoelectric cell controlled by a gear mounted to turn with wheel 22. The preselector computers are usually electronic, for example any one of several binary models for sale on the market, but an ordinary decimal mechanical counter is also useful. Supposing that the length of glass to be cut off is 3,137 mm., this figure is imposed on the counter according to its nature or even is carried out manually; thereafter each impulse constitues a unity, the counter itself generating the impulse. In one known type, a AND circuit passes the impulse of the counter at 0.0000 mm (or if one wishes to account for slippage, at 0.0010 mm.) and this excites the command relay which controls elements 19 and 18. The secondary controls involve a second AND circuit which constitutes the preselector and which releases the impulse of the counter when it marks, for instance, 0100 mm., exciting the relay which controls clutch 33. The preselector counter is diagrammed in FIG. 2 at 24 of the drawings, with control lines for 0010 and 0100 mm. indicated.

We claim:

1. Apparatus for marking measured lengths along a continuously moving ribbon supported on ribbon driving means, said apparatus comprising a bridge spanning the ribbon, marking means in the bridge, rails supporting the bridge for reciprocating motion lengthwise of the ribbon, means arranged in the bridge and engaging the ribbon to measure relative motion of the ribbon and bridge lengthwise of the ribbon, means to clamp the bridge to the ribbon, a drive train including a clutch, said drive train being coupled at one end to said driving means and being coupled at the other end to said bridge, said drive train imposing upon said bridge when said clutch is engaged a speed less than that of said ribbon, means coupled to said measuring means to generate successive first and second signals upon measurement of first and second lengths by said measuring means, means responsive to said first signal to engage said clutch, and means responsive to said second signal to engage said clamping means, to activate said marking means, and to disengage said clutch and clamping means, whereby said bridge can be stopped and returned to its starting point.

2. Apparatus according to claim 1 further comprising an overrunning clutch in said drive train permitting, upon activation of said clamping means, entrainment of the bridge by the ribbon at a higher speed than called for by said drive train.

3. Apparatus according to claim 2 further comprising a motor, a brake, and an additional clutch, said motor and brake connecting via said additional clutch into said drive train between said overrunning clutch and bridge, whereby upon disengagement of said first-named clutch and clamping means and upon engagement of said additional clutch the bridge may be decelerated by activation of said brake and may be restored upstream of said ribbon upon energization of said motor.

* * * * *